United States Patent
Zhu et al.

(10) Patent No.: US 11,742,531 B2
(45) Date of Patent: Aug. 29, 2023

(54) CHARGING METHOD, ELECTRONIC APPARATUS, AND STORAGE MEDIUM

(71) Applicant: NINGDE AMPEREX TECHNOLOGY LTD., Fujian (CN)

(72) Inventors: Shan Zhu, Ningde (CN); Ting Guan, Ningde (CN); Fei Wu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 316 days.

(21) Appl. No.: 17/280,359

(22) PCT Filed: Nov. 5, 2019

(86) PCT No.: PCT/CN2019/115556
§ 371 (c)(1),
(2) Date: Mar. 26, 2021

(87) PCT Pub. No.: WO2021/056688
PCT Pub. Date: Apr. 1, 2021

(65) Prior Publication Data
US 2021/0351446 A1 Nov. 11, 2021

(30) Foreign Application Priority Data
Sep. 29, 2019 (CN) .......................... 201910934524.0

(51) Int. Cl.
*H01M 10/44* (2006.01)
*H02J 7/00* (2006.01)
(Continued)

(52) U.S. Cl.
CPC ......... *H01M 10/44* (2013.01); *H01M 10/052* (2013.01); *H01M 10/425* (2013.01);
(Continued)

(58) Field of Classification Search
CPC .. H01M 10/44; H01M 10/052; H01M 10/425; H01M 10/48; H01M 2010/4271; H02J 7/0048; H02J 7/00712; H02J 7/0068
(Continued)

(56) References Cited

U.S. PATENT DOCUMENTS

2011/0127958 A1 6/2011 Ishishita et al.
2014/0111145 A1 4/2014 Mitsuda et al.
(Continued)

FOREIGN PATENT DOCUMENTS

| CN | 102810700 A | 12/2012 |
|---|---|---|
| CN | 102769156 B | 4/2015 |

(Continued)

OTHER PUBLICATIONS

International Search Report dated Jun. 28, 2020, issued in counterpart application No. PCT/CN2019/115556 (4 pages).
(Continued)

*Primary Examiner* — Nathaniel R Pelton
(74) *Attorney, Agent, or Firm* — WHDA, LLP

(57) ABSTRACT

A method of a charging battery includes the following steps: charging the battery with a first charging current in an $n^{th}$ charge and discharge cycle, where n is an integer greater than or equal to 0; and charging the battery with a second charging current in an $(n+m)^{th}$ charge and discharge cycle, where m is a preset integer greater than or equal to 1, $I_b = k_1 \times I_c$, $0.5 \leq k_1 \leq 1$, and $I_c$ is a third charging current, where the third charging current is a smaller one of a first maximum charging current and a second maximum charging current in a same state of charge. This application further provides an electronic apparatus and a storage medium.

18 Claims, 9 Drawing Sheets

(51) Int. Cl.
  *H01M 10/052* (2010.01)
  *H01M 10/42* (2006.01)
  *H01M 10/48* (2006.01)

(52) U.S. Cl.
  CPC ........... *H01M 10/48* (2013.01); *H02J 7/0048* (2020.01); *H02J 7/0068* (2013.01); *H02J 7/00712* (2020.01); *H01M 2010/4271* (2013.01)

(58) Field of Classification Search
  USPC ........................................................ 320/130
  See application file for complete search history.

(56) References Cited

U.S. PATENT DOCUMENTS

| | | | | |
|---|---|---|---|---|
| 2019/0031035 A1* | 1/2019 | Koch | ............... | H01M 10/0525 |
| 2019/0181491 A1* | 6/2019 | Park | ..................... | H01M 4/386 |
| 2019/0305367 A1* | 10/2019 | Miyajima | ......... | H01M 10/0525 |

FOREIGN PATENT DOCUMENTS

| | | |
|---|---|---|
| CN | 106099230 A | 11/2016 |
| CN | 106129508 A | 11/2016 |
| CN | 106450536 A | 2/2017 |
| CN | 109546248 A | 3/2019 |
| CN | 109586373 A | 4/2019 |
| CN | 110165318 A | 8/2019 |
| EP | 2325972 A2 | 5/2011 |
| EP | 2 804 249 A1 | 11/2014 |
| JP | 2006-345634 A | 12/2006 |
| JP | 2018-107053 A | 7/2018 |
| WO | 2019113350 A1 | 6/2019 |

OTHER PUBLICATIONS

Written Opinion dated Jun. 28, 2020, issued in counterpart application No. PCT/CN2019/115556 (3 pages).
Extended (Supplementary) European Search Report dated Jun. 21, 2022, issued in counterpart EP application No. 19945477.8. (7pages).
Office Action dated May 4, 2022, issued in counterpart IN application No. 202117015371. (6 pages).
Office Action dated Sep. 1, 2021, issued in counterpart CN application No. 201910934524.0, with English translation. (6 pages).
Office Action dated Apr. 19, 2022, issued in counterpart JP application No. 2021-516764, with English translation. (8 pages).
Office Action dated Nov. 1, 2022, issued in counterpart JP application No. 2021-516764, with English translation. (5 pages).

* cited by examiner

CHARGING METHOD, ELECTRONIC APPARATUS, AND STORAGE MEDIUM

CROSS-REFERENCE TO RELATED APPLICATIONS

This application claims priority to International Application No. PCT/CN2019/115556, filed on Nov. 5, 2019 and entitled "CHARGING METHOD, ELECTRONIC APPARATUS, AND STORAGE MEDIUM", which is incorporated herein by reference in its entirety.

TECHNICAL FIELD

This application relates to the field of battery technologies, and in particular, to a method of charging a battery, an electronic apparatus, and a storage medium.

BACKGROUND

In the prior art, a method of charging a battery is generally a constant-current and constant-voltage charging method or a fast charging method. In the two methods, a battery is charged from the perspective of protecting an anode of the battery. However, although protecting the anode can ensure that no lithium precipitation occurs on the battery, which is of great help to performance of the battery, determining a limit current only from the anode protection perspective cannot protect materials such as a cathode and an electrolyte solution, and may have a great impact on cycle life of the battery. Therefore, it is necessary to propose a method of charging a battery that can protect the battery from both the anode perspective and the cathode perspective.

SUMMARY

In view of this, it is necessary to provide a method of charging a battery, an electronic apparatus, and a storage medium, to protect a cyclic charging and discharging process of the battery and ensure cycle life of the battery.

An embodiment of this application provides a method of charging a battery. The method includes steps of: charging the battery with a first charging current $I_a$ in an $n^{th}$ charge and discharge cycle, where n is an integer greater than or equal to 0; and charging the battery with a second charging current $I_b$ in an $(n+m)^{th}$ charge and discharge cycle, where m is a preset integer greater than or equal to 1, $I_b = k_1 \times I_c$, $0.5 \leq k_1 \leq 1$, and $I_c$ is a third charging current, where the third charging current $I_c$ is a smaller one of a first maximum charging current and a second maximum charging current in a same state of charge, the first maximum charging current $I_{max1}$ is a maximum current of an anode of the battery in different states of charge in the $n^{th}$ charge and discharge cycle without lithium precipitation, and the second maximum charging current $I_{max2}$ is a maximum current that controls side reactions of a cathode material and an electrolyte solution of the battery in the different states of charge in the $n^{th}$ charge and discharge cycle.

According to some embodiments of this application, the maximum current of the anode of the battery in the different states of charge in the $n^{th}$ charge and discharge cycle without lithium precipitation is obtained by using the following steps: obtaining lithium-precipitation charging rates of the battery at different temperatures; determining lithium-precipitation anode potentials of the battery at the different temperatures based on the lithium-precipitation charging rates; and obtaining the maximum current of the battery in the different states of charge in the $n^{th}$ charge and discharge cycle without the lithium precipitation based on the lithium-precipitation anode potentials at the different temperatures.

According to some embodiments of this application, the step of obtaining lithium-precipitation charging rates of the battery at different temperatures includes: a first charging step, after the battery is discharged to a fully discharged state, charging the battery with a first preset current to a fully charged state at a preset temperature; a first discharging step, discharging the battery with a second preset current to the fully discharged state; a cycling step, determining whether lithium-precipitation occurs on the battery after the first charging step and the first discharging step are cycled for a preset quantity of times; a first determining step, when lithium-precipitation occurs on the battery, determining a lithium-precipitation charging rate of the battery at the preset temperature; and a first repeating step, changing the preset temperature, and repeating the first charging step to the first repeating step to obtain the lithium-precipitation charging rates of the battery at the different temperatures.

According to some embodiments of this application, the step of determining lithium-precipitation anode potentials of the battery at the different temperatures based on the lithium-precipitation charging rates includes: a second charging step, at the preset temperature, charging the battery at the lithium-precipitation charging rate corresponding to the preset temperature; a monitoring step, monitoring an anode potential of the battery in a charging process; a second determining step, determining a lithium-precipitation anode potential of the battery at the preset temperature based on a change of the anode potential; and a second repeating step, changing the preset temperature, and repeating the second charging step to the second repeating step to obtain the lithium-precipitation anode potentials of the battery at the different temperatures.

According to some embodiments of this application, the step of obtaining the maximum current of the battery in different states of charge without lithium precipitation based on the lithium-precipitation anode potentials at the different temperatures includes obtaining the maximum current of the battery in the different states of charge without the lithium precipitation in the charging process at each of the different temperatures by following steps: at a preset temperature corresponding to the each of the different temperatures, charging the battery with a preset initial charging current; in a charging process of the $n^{th}$ charge and discharge cycle, controlling an anode potential of the battery to remain as a lithium-precipitation anode potential corresponding to the preset temperature; and at the preset temperature, monitoring and obtaining the maximum current of the battery in the different states of charge without the lithium precipitation in the charging process.

According to some embodiments of this application, the maximum current that controls the side reactions of the cathode material and the electrolyte solution of the battery in the different states of charge in the $n^{th}$ charge and discharge cycle is obtained by using the following steps: obtaining anodic polarization impedance of the battery in the different states of charge; obtaining battery polarization impedance of the battery in the different states of charge in the $n^{th}$ charge and discharge cycle, where n is an integer greater than or equal to 0; calculating a cathodic polarization impedance of the battery in the different states of charge in the $n^{th}$ charge and discharge cycle based on the battery polarization impedance and the anodic polarization impedance; obtaining cathode open-circuit voltages of the battery in the different states of charge and a cathodic limit potential of the battery; and calculating, based on the cathode open-circuit voltages, the cathodic limit potential, and the cathodic polarization impedance, the maximum current that controls the side reactions of the cathode material and the electrolyte solution of the battery in the different states of charge in the $n^{th}$ charge and discharge cycle of the battery.

According to some embodiments of this application, the step of obtaining anodic polarization impedance of the battery in the different states of charge includes: obtaining state of charge (SOC)-open-circuit voltage (OCV) correspondences of the anode of the battery; discharging the battery with a preset current to obtain a discharge curve of the anode of the battery; and obtaining the anodic polarization impedance based on the SOC-OCV correspondences of the anode and the discharge curve of the anode.

According to some embodiments of this application, the step of obtaining the anodic polarization impedance based on the SOC-OCV correspondences of the anode and the discharge curve of the anode includes: a first processing step, normalizing the discharge curve of the anode based on the SOC-OCV correspondences of the anode; a first obtaining step, obtaining an anode open-circuit voltage and an anode discharge potential in a state of charge based on the SOC-OCV correspondences of the anode and the normalized discharge curve of the anode; a first calculation step, calculating the anodic polarization impedance in the state of charge based on the anode open-circuit voltage and the anode discharge potential, where the anodic polarization impedance is equal to a value obtained by subtracting the anode discharge potential from the anode open-circuit voltage and dividing a resulting difference by the preset current; and a first repeating step, changing the state of charge, and repeating the first obtaining step to the first repeating step to obtain the anodic polarization impedance of the battery in the different states of charge.

According to some embodiments of this application, the step of obtaining the battery polarization impedance of the battery in the different states of charge in the $n^{th}$ charge and discharge cycle includes: obtaining state of charge (SOC)-open-circuit voltage (OCV) correspondences of the battery; discharging the battery with a preset current to obtain a discharge curve of the battery in the $n^{th}$ charge and discharge cycle; and obtaining the battery polarization impedance of the battery in the different states of charge in the $n^{th}$ charge and discharge cycle based on the SOC-OCV correspondences and the discharge curve of the battery.

According to some embodiments of this application, the step of obtaining the battery polarization impedance of the battery in the different states of charge in the $n^{th}$ charge and discharge cycle based on the SOC-OCV correspondences and the discharge curve of the battery includes: a second processing step, normalizing the discharge curve of the battery based on the SOC-OCV correspondences of the battery; a second obtaining step, obtaining a battery open-circuit voltage and a battery voltage in a state of charge based on the SOC-OCV correspondences and the normalized discharge curve of the battery; a second calculation step, calculating the battery polarization impedance in the state of charge based on the battery open-circuit voltage and the battery voltage, where the battery polarization impedance is equal to a value obtained by subtracting the battery voltage from the battery open-circuit voltage and dividing a resulting difference by the preset current; and a second repeating step, changing the state of charge, and repeating the second obtaining step to the second repeating step to obtain the battery polarization impedance of the battery in the different states of charge in the $n^{th}$ charge and discharge cycle.

According to some embodiments of this application, the step of calculating the cathodic polarization impedance of the battery in the different states of charge in the $n^{th}$ charge and discharge cycle based on the battery polarization impedance and the anodic polarization impedance includes: a first obtaining step, obtaining an anodic polarization impedance of the battery in a state of charge; in a second obtaining step, obtaining battery polarization impedance of the battery in the state of charge in the $n^{th}$ charge and discharge cycle; a third calculation step, subtracting the anodic polarization impedance from the battery polarization impedance to obtain the cathodic polarization impedance; and a third repeating step, changing the state of charge, and repeating the first obtaining step to the third repeating step to obtain the cathodic polarization impedance of the battery in the different states of charge in the $n^{th}$ charge and discharge cycle.

According to some embodiments of this application, the step of calculating, based on the cathode open-circuit voltages, the cathodic limit potential, and the cathodic polarization impedance, the maximum current that controls the side reactions of the cathode material and the electrolyte solution of the battery in the different states of charge in the $n^{th}$ charge and discharge cycle of the battery includes: obtaining a cathodic polarization impedance $R_c$ of the battery in a state of charge in the $n^{th}$ charge and discharge cycle; obtaining a cathode open-circuit voltage $OCV_c$ of the battery in the state of charge; calculating a maximum current that controls the side reactions of the cathode material and the electrolyte solution of the battery in the state of charge in the $n^{th}$ charge and discharge cycle of the battery; and changing the state of charge, and repeating the foregoing steps to obtain the maximum current that controls the side reactions of the cathode material and electrolyte solution of the battery in the different states of charge in the $n^{th}$ charge and discharge cycle of the battery.

According to some embodiments of this application, the second maximum charging current $I_{max2}$ that controls the side reactions of the cathode material and the electrolyte solution of the battery in the state of charge in the $n^{th}$ charge and discharge cycle of the battery is calculated by using the following formula: Second maximum charging current $I_{max2}=(U_L-OCV_c)/R_c$, where $U_L$ is the cathodic limit potential.

According to some embodiments of this application, the third charging current $I_c$ is obtained by using the following steps: in a state of charge, comparing the first maximum charging current $I_{max1}$ with the second maximum charging current $I_{max2}$; using a smaller one of the first maximum charging current $I_{max1}$ and the second maximum charging current $I_{max2}$ as a third charging current $I_c$ of the battery in the state of charge; changing the state of charge, and repeating the foregoing steps to determine third charging currents $I_c$ of the battery in the different states of charge; and establishing a relationship between the state of charge and the third charging current $I_c$.

According to some embodiments of this application, the step of charging the battery with a second charging current in the $(n+m)^{th}$ charge and discharge cycle includes: in the $(n+m)^{th}$ charge and discharge cycle, dividing states of charge of the battery in a charging process into N intervals; obtaining, based on the correspondences, third charging currents $I_c$ corresponding to states of charge in each of the N intervals; obtaining a minimum value of the third charging currents $I_c$ corresponding to the states of charge in each interval, and using a product of the minimum value and $k_2$ as a corresponding second charging current $I_b$ of the interval, where $0.5 \le k_2 \le 1$; and in the $(n+m)^{th}$ charge and discharge cycle, charging the battery to a fully charged state with the second charging current $I_b$ corresponding to the interval.

According to some embodiments of this application, a charge capacity of each interval is equal to a product of an absolute value of a difference between states of charge corresponding to two end points of the corresponding interval and a discharge capacity $Q_n$ of the battery in the $n^{th}$ charge and discharge cycle, where a charge cut-off capacity when the battery is charged to the fully charged state is the discharge capacity $Q_n$.

An embodiment of this application provides an electronic apparatus, the electronic apparatus includes a battery and a processor, and the processor is configured to perform the foregoing method to charge the battery.

An embodiment of this application provides a storage medium storing at least one computer instruction, and the instruction is loaded by a processor and used to perform the foregoing method.

Compared with the prior art, according to the method of charging a battery, the electronic apparatus, and the storage medium, a charging current for charging a battery is determined so as to not only suppress side reactions of a cathode and an electrolyte solution of the battery but also avoid lithium precipitation at an anode, and the battery is charged with the determined charging current. This can not only implement fast charging of fresh batteries and cycled batteries, but also ensure that the batteries have long cycle life under fast charging.

REFERENCE NUMERALS OF MAIN COMPONENTS

| | |
|---|---|
| Electronic apparatus | 1 |
| Charging system | 10 |
| Memory | 11 |
| Processor | 12 |
| Battery | 13 |
| First charging module | 101 |
| Second charging module | 102 |

This application is further described with reference to the accompanying drawings in the following specific embodiments.

DESCRIPTION OF EMBODIMENTS

The following explains some terminologies used in this application to help understand this application.

To make the objectives, technical solutions, and advantages of this application more comprehensible, the following describes this application in detail with reference to embodiments and accompanying drawings. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be further noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Figure 1:
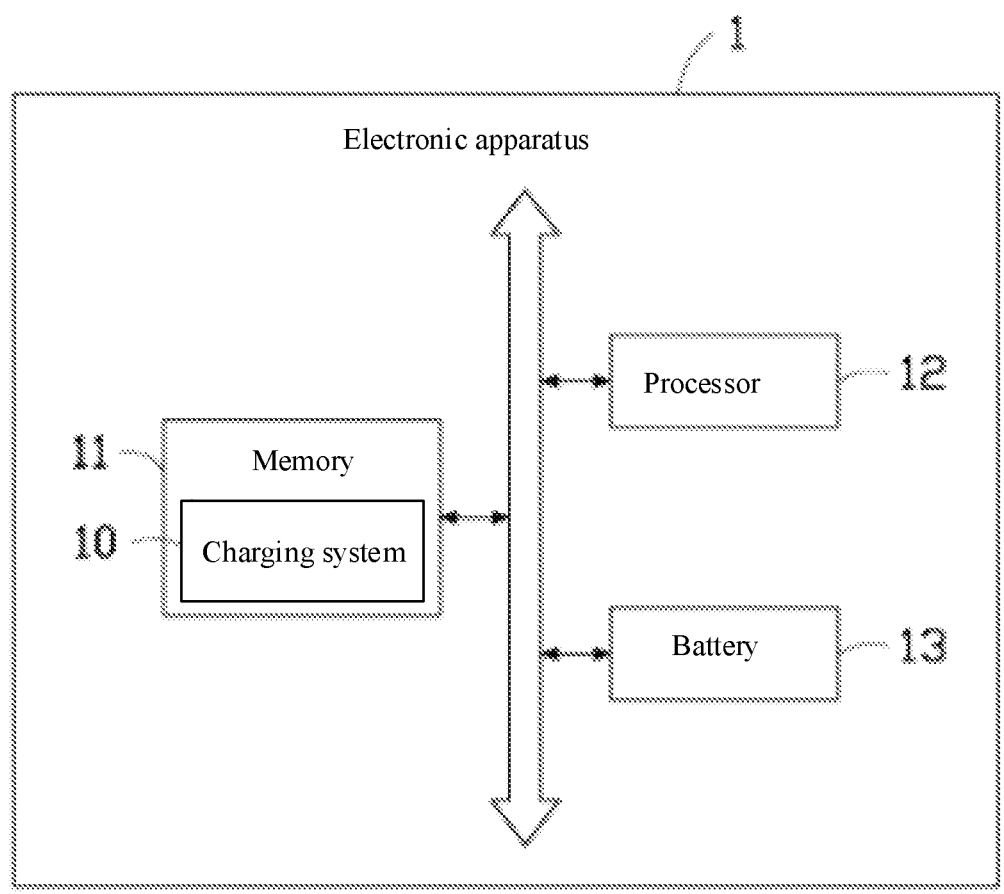
FIG. 1 is a schematic structural diagram of an electronic apparatus according to an embodiment of this application.

Referring to FIG. 1, a charging system 10 runs in an electronic apparatus 1. The electronic apparatus 1 includes, but is not limited to, a memory 11, at least one processor 12, and a battery 13. The foregoing components may be connected by a bus or directly connected.

In an embodiment, the electronic apparatus 1 includes, but is not limited to, at least one processor 12 and a battery 13. The at least one processor 12 and the battery 13 may be connected by a bus or directly connected.

It should be noted that FIG. 1 shows only an example of the electronic apparatus 1. In other embodiments, the electronic apparatus 1 may alternatively include more or fewer components, or have different component configurations. The electronic apparatus 1 may be an electric motorcycle, an electric bicycle, an electric car, a mobile phone, a tablet computer, a personal digital assistant, a personal computer, or any other suitable rechargeable apparatuses.

In an embodiment, the battery 13 is a rechargeable battery configured to supply electrical energy to the electronic apparatus 1. For example, the battery 13 may be a lithium-ion battery, a lithium polymer battery, a lithium iron phosphate battery, or the like. The battery 13 includes at least one battery cell (battery cell). The battery 13 can be cyclically recharged. The battery 13 is logically connected to the processor 12 through a power management system, so that functions such as charge, discharge, and power consumption management are implemented by using the power management system.

Although not shown, the electronic apparatus 1 may further include other components such as a wireless fidelity (WiFi) unit, a Bluetooth unit, and a speaker. Details are not described herein.

Figure 2:
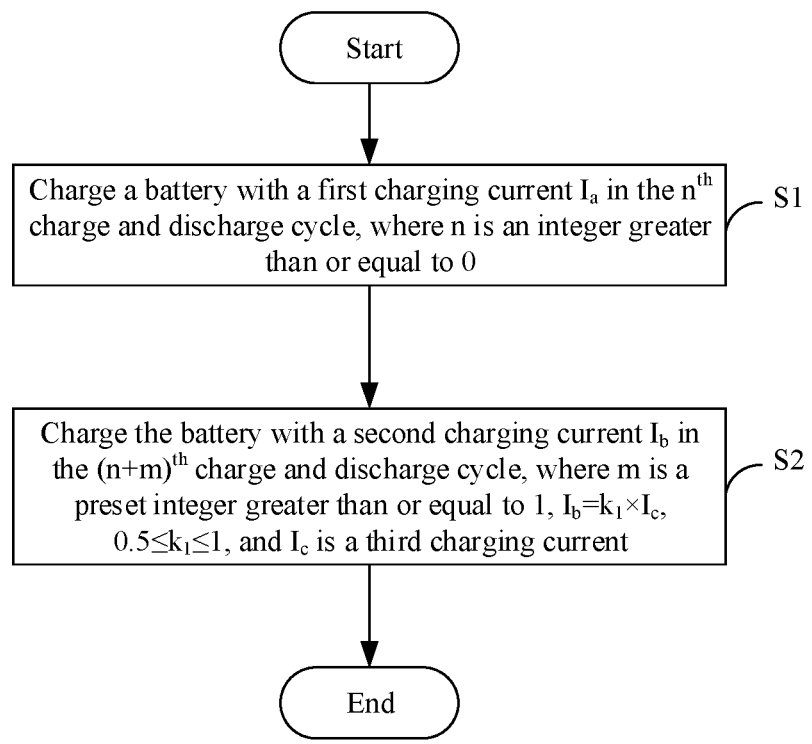
FIG. 2 is a flowchart of a method of charging a battery according to an embodiment of this application.

FIG. 2 is a flowchart of a method of charging a battery according to an embodiment of this application. The order of the steps in the flowchart may be changed based on different requirements, and some steps may be omitted. The method of charging a battery may include the following steps.

Step S1: Charge the battery with a first charging current $I_a$ in an $n^{th}$ charge and discharge cycle, where n is an integer greater than or equal to 0.

In this embodiment, the first charging current $I_a$ is related to the battery. For example, when the battery is a lithium-ion battery, a charging process of the lithium-ion battery includes a first phase of constant-current charging. In other words, the lithium-ion battery is constant-current charged with the first charging current $I_a$. In the charging process, a voltage of the lithium-ion battery gradually increases. For example, when the voltage of the lithium-ion battery reaches a cut-off voltage (for example, 4.2V), the battery enters a second phase of constant-voltage charging, that is, the voltage of the lithium-ion battery is maintained at 4.2V. However, the first charging current $I_a$ gradually decreases in the charging process based on a saturation degree of the battery cell of the lithium-ion battery, and battery charging is stopped when a cut-off current (for example, 0.01 C) is reached.

Step S2: Charge the battery with a second charging current $I_b$ in an $(n+m)^{th}$ charge and discharge cycle, where m is a preset integer greater than or equal to 1, $I_b = k_1 \times I_c$, $0.5 \le k_1 \le 1$, and $I_c$ is a third charging current, where the third charging current $I_c$ is a smaller one of a first maximum charging current $I_{max1}$ and a second maximum charging current $I_{max2}$ in a same state of charge, the first maximum charging current $I_{max1}$ is a maximum current of an anode of the battery in different states of charge in the $n^{th}$ charge and discharge cycle without the lithium precipitation, and the second maximum charging current $I_{max2}$ is a maximum current that controls side reactions of a cathode material and an electrolyte solution of the battery in the different states of charge in the $n^{th}$ charge and discharge cycle.

In other embodiments, $0.8 \le k_1 \le 1$, and a larger $k_1$ indicates shorter charge time required to charge the battery to a fully charged state.

In this embodiment, the maximum current (that is, the first maximum charging current $I_{max1}$) of the anode of the battery in the different states of charge in the $n^{th}$ charge and discharge cycle without the lithium precipitation may be obtained by using the following method. The details are as follows.

(1) Lithium-precipitation charging rates of the battery at different temperatures are obtained.

Specifically, the method for obtaining lithium-precipitation charging rates of the battery at different temperatures includes the following steps:

(a1) After the battery is discharged to a fully discharged state, the battery is charged with a first preset current to a fully charged state at a preset temperature. The first preset current may be 1 C, 1.1 C, or 1.2 C. It should be noted that C is a charge/discharging rate. The charge/discharging rate refers to a current value required to charge a battery to a rated capacity or discharge the battery by a rated capacity within specified time. C is numerically equal to a charging/discharging current/rated battery capacity. For example, when a battery with a rated capacity of 10 Ah is discharged at 2 A, a discharging rate of the battery is 0.2 C. When the battery is discharged at 20 A, a discharging rate of the battery is 2 C. It should be noted that the charging the battery with a first preset current to a fully charged state at a preset temperature means charging the battery to a battery level of 100%.

(b1) The battery is discharged with a second preset current to the fully discharged state. The second preset current may be 0.2 C or other values. In this embodiment, the fully discharged state means that the battery level of the battery is 0 after the battery is discharged. In other embodiments, the fully discharged state may mean that the battery is discharged to a preset power level or a preset voltage.

(c1) Whether lithium-precipitation occurs on the battery is determined after the step (a1) and step (b1) are cycled for a preset quantity of times. After the battery is charged and discharged for 5 to 10 times, the battery is fully charged, and then the battery is disassembled to observe whether lithium precipitation occurs on an anode plate of the battery. When lithium precipitation occurs on the anode plate, it is determined that lithium precipitation occurs on the battery. When no lithium precipitation occurs on the anode plate, it is determined that no lithium precipitation occurs on the battery. It should be noted that a method for determining whether lithium precipitation occurs on the battery is not limited to the battery disassembling method, and may alternatively be any other implementable method, for example, a method for determining whether lithium precipitation occurs by monitoring a battery voltage change. It should be noted that the fully charging the battery means charging the battery to a battery level of 100%.

(d1) When lithium-precipitation occurs on the battery, a lithium-precipitation charging rate of the battery at the preset temperature is determined; and then the preset temperature is changed, and step (a1) to step (d1) are repeated to obtain the lithium-precipitation charging rates of the battery at the different temperatures.

(2) Lithium-precipitation anode potentials of the battery at the different temperatures are determined based on the lithium-precipitation charging rates.

In this embodiment, an anode potential of the battery in a charging process is monitored by using three electrodes, to determine the lithium-precipitation anode potentials of the battery at the different temperatures. The details are as follows:

(a2) At the preset temperature (for example, 25 degrees Celsius), the battery is charged at the lithium-precipitation charging rate corresponding to the preset temperature.

(b2) The anode potential of the battery in the charging process is monitored.

(c2) A lithium-precipitation anode potential of the battery at the preset temperature is determined based on a change of the anode potential. The following method is used to determine the lithium-precipitation anode potential: At the preset temperature (for example, 25 degrees Celsius), the battery is charged at the lithium-precipitation charging rate corresponding to the preset temperature, the anode potential in the charging process is monitored by using three electrode, and a minimum value of the obtained anode potential is used as the lithium-precipitation anode potential at the preset temperature.

(d2) The preset temperature is changed, and step (a2) to step (d2) are repeated to obtain the lithium-precipitation anode potentials of the battery at the different temperatures.

(3) The maximum current (that is, the first maximum charging current $I_{max1}$) of the battery in the different states of charge in the $n^{th}$ charge and discharge cycle without the lithium precipitation are obtained based on the lithium-precipitation anode potentials at the different temperatures.

In an embodiment, the method for obtaining the first maximum charging current of the battery in the different states of charge in the $n^{th}$ charge and discharge cycle based on the lithium-precipitation anode potentials at the different temperatures includes obtaining the maximum current of the battery in the different states of charge without the lithium precipitation in the charging process at each of the different temperatures by following steps:

(a3) at a preset temperature corresponding to the each of the different temperatures, charging the battery with a preset initial charging current (for example, 1 C);

(b3) in a charging process of the $n^{th}$ charge and discharge cycle, controlling an anode potential of the battery to remain as a lithium-precipitation anode potential corresponding to the preset temperature, and constant-voltage charging the battery; and (c3) at the preset temperature, monitoring and obtaining the maximum current (i.e., a first maximum charging current) of the battery in the different states of charge without the lithium precipitation in the charging process.

It should be noted that after the preset temperature is changed, the battery experiencing n−1 charge and discharge cycles is used to repeat steps (a3) to (d3), so as to obtain the first maximum charging current of the battery in the different states of charge in the $n^{th}$ charge and discharge cycle at the different temperatures.

In other embodiments, the first maximum charging current may be obtained by using a fresh battery. Specifically, the method for obtaining the first maximum charging current by using a fresh battery includes: obtaining lithium-precipitation charging rates of the fresh battery at different temperatures; and determining lithium-precipitation anode potentials of the fresh battery at the different temperatures based on the lithium-precipitation charging rates; and obtaining the first maximum charging current of the fresh battery in different states of charge based on the lithium-precipitation anode potential at the different temperatures. The fresh battery is an uncycled battery just leaving the factory, or batteries whose quantity of charge and discharge cycles after leaving the factory is less than a preset number (for example, 10 times, or other times). In addition, steps similar to steps (a3) to (d3) may also be used to obtain the first maximum charging current of the fresh battery in the different states of charge at the different temperatures, and establish correspondences between the first maximum charging current, and the temperatures and the states of charge.

In this embodiment, the maximum current (that is, the second maximum charging current $I_{max2}$) that controls the side reactions of the cathode material and the electrolyte solution of the battery in the different states of charge in the $n^{th}$ charge and discharge cycle is obtained, where the side reactions may occur on the cathode material or the electrolyte solution, or may occur between the cathode material and the electrolyte solution.

In this embodiment, from the perspective of protecting a cathode of the battery, the second maximum charging current of the battery in the different states of charge in the $n^{th}$ charge and discharge cycle may be obtained. When a voltage of the battery in the charging process is too high, the side reactions occur on the cathode of the battery, and the side reactions damage the battery, affecting service life of the battery. For example, when the voltage exceeds a maximum voltage that the cathode material and electrolyte solution of the battery can withstand, the cathode material and electrolyte solution of the battery are damaged. For another example, the electrolyte solution of the battery accelerates the side reactions. Therefore, in a process of charging the battery, it is not only necessary to protect the anode of the battery, but also necessary to protect the cathode of the battery.

Specifically, the method for obtaining the second maximum charging current of the battery in the different states of charge in the $n^{th}$ charge and discharge cycle includes:

(1) An anodic polarization impedance of the battery in the different states of charge is obtained.

Specifically, the method for obtaining the anodic polarization impedance of the battery in the different states of charge includes: obtaining state of charge (SOC)-open-circuit voltage (OCV) correspondences of the anode of the battery; discharging the battery with a preset current to obtain a discharge curve of the anode of the battery; and obtaining the anodic polarization impedance based on the SOC-OCV correspondences of the anode and the discharge curve of the anode.

In another embodiment, anodic polarization impedance of a fresh battery in different states of charge may alternatively be obtained to serve as the anodic polarization impedance of the battery in the different states of charge (SOC). The anodic polarization impedance in a cycling process of the battery changes less than the cathodic polarization impedance, and a battery polarization impedance increase mainly comes from the cathode. Therefore, for ease of obtaining the anodic polarization impedance of the battery in the different states of charge (SOC), the anodic polarization impedance in the different states of charge of the fresh battery obtained by using a three-electrode monitoring method serves as the anodic polarization impedance of the battery at the different states of charge (SOC). It should be noted that the fresh battery is an uncycled battery just leaving the factory, or a battery whose quantity of charge and discharge cycles after leaving the factory is less than a preset number (for example, 10 times, or other times). The fresh battery is used to obtain battery parameters (for example, anodic polarization impedance), and a maximum charging current of a battery with longest service life in a charging process may be obtained through calculation based on the obtained parameters. A method for obtaining the anodic polarization impedance of the fresh battery in the different states of charge is the same as the method for obtaining the anodic polarization impedance of the battery in the different states of charge. This is not repeated herein.

In an embodiment, the state of charge (SOC)-open-circuit voltage (OCV) correspondences of the anode of the battery may be obtained by using the following method.

1) A battery is taken and charged to a fully charged state, and then the battery is discharged with a first preset current to a fully discharged state. In this embodiment, the first preset current is a small rate current, for example, 0.01 C, or may be other values. It should be noted that the charging the battery to a fully charged state means charging the battery to a power level of 100%, and that the discharging the battery to a fully discharged state means that the battery level of the battery is 0 after the battery is discharged.

2) Voltage and capacity changes of the battery in the charging and discharging processes are recorded, and a cathode potential and an anode potential of the battery are monitored by using three electrodes.

3) A state of charge of the battery in the discharging process is obtained. For example, a maximum discharge capacity of the battery is used as a full load capacity of the battery, and a value of a capacity of the battery that changes with time in the discharging process is divided by the full load capacity to obtain the state of charge of the battery in the discharging process.

Figure 3:
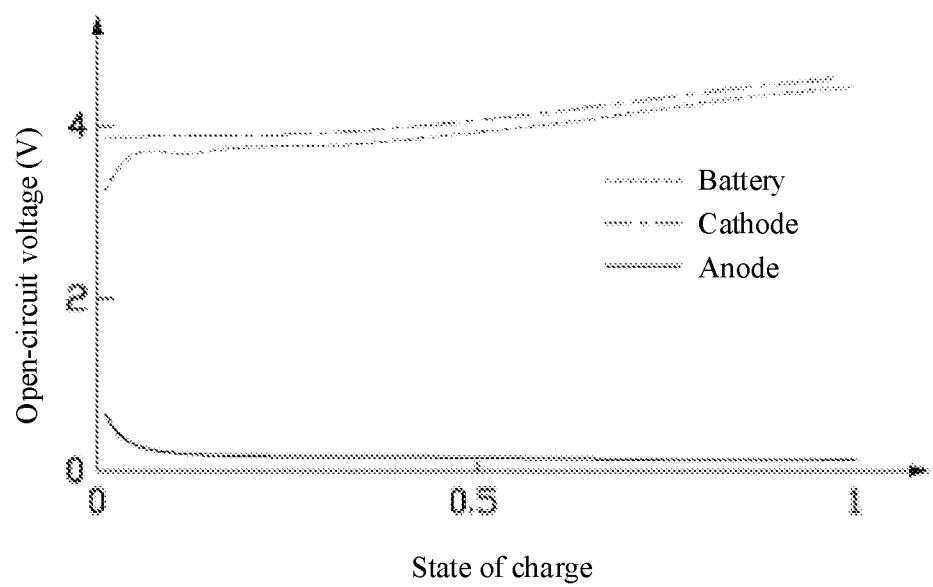
FIG. 3 is a graph of a state of charge-open-circuit voltage relationship curve of a battery.

4) Correspondences between battery voltages, cathode potentials, and anode potentials of the battery in different states of charge in the discharging process are separately established to obtain a SOC-OCV curve of the battery, a SOC-OCV curve of a cathode, and a SOC-OCV curve of an anode, as shown in FIG. 3. In other embodiments, these SOC-OCV curves may alternatively be obtained by using other discharging methods.

In an embodiment, the discharge curve of the anode of the battery may be obtained by using the following method.

1) A battery is taken and charged to a fully charged state. It should be noted that the charging the battery to a fully charged state means charging the battery to a power level of 100%.

2) The battery is stood for 30 min, a voltage of the battery after standing is recorded, and a cathode potential and an anode potential of the battery are monitored by using three electrodes.

3) The battery is discharged with a second preset current to a fully discharged state, and changes of the voltage, a discharge capacity, the cathode potential, and the anode potential of the battery in the discharging process are recorded, where the second preset current may be 0.2 C or 0.5 C, or other values. The discharging the battery to a fully discharged state means that the battery level of the battery is 0 after the battery is discharged.

4) The fully discharged battery is stood for 30 min, a voltage of the battery after standing is recorded, and a cathode potential and an anode potential of the battery are monitored by using three electrodes.

Figure 4:
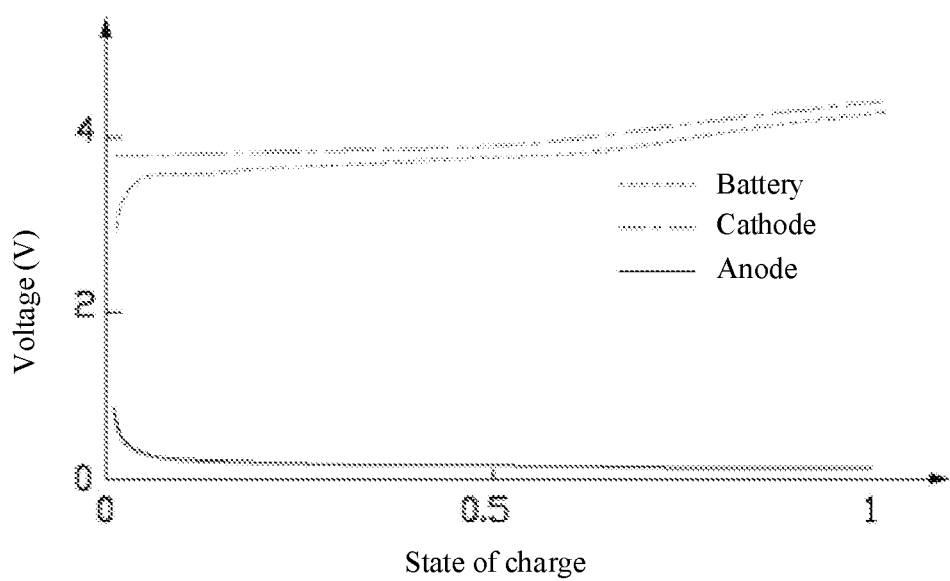
FIG. 4 is a discharge curve graph of a battery.

5) Voltage-capacity/SOC correspondences, cathode potential-capacity/SOC correspondences, and anode potential-capacity/SOC correspondences of the battery in the discharging process are established to obtain a discharge curve of the battery, a discharge curve of a cathode, and a discharge curve of an anode, as shown in FIG. 4.

Figure 5:
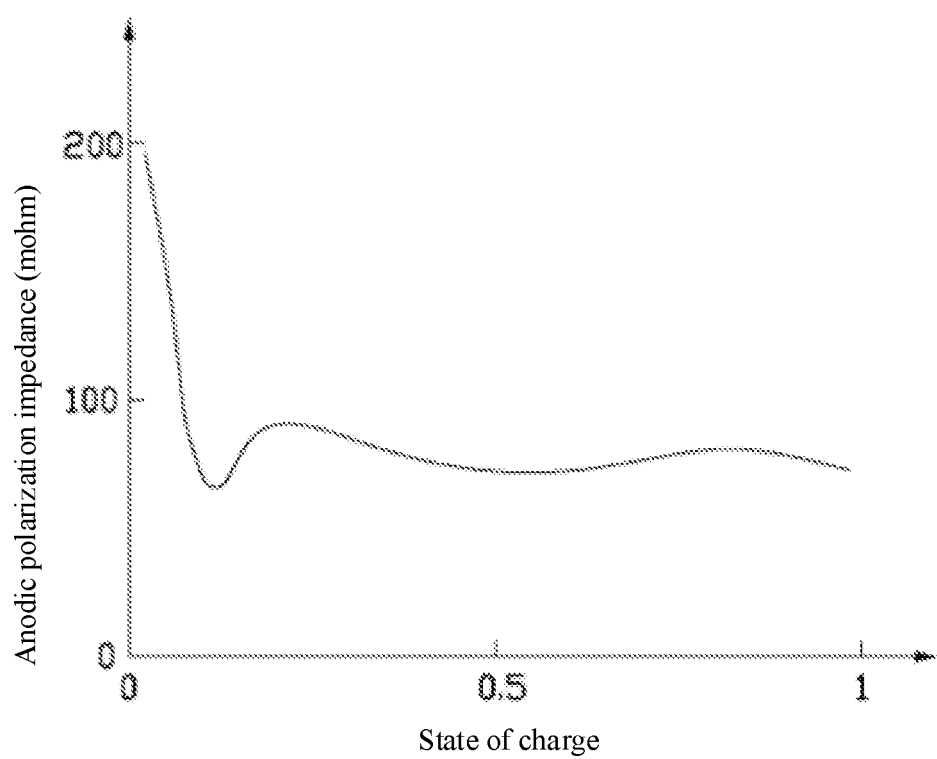
FIG. 5 is a graph of a state of charge-anodic polarization impedance relationship curve of a battery.

In this embodiment, the method for obtaining the anodic polarization impedance based on the SOC-OCV correspondences of the anode and the discharge curve of the anode includes:

(a1) normalizing the discharge curve of the anode based on the SOC-OCV correspondences of the anode;

(b1) obtaining an anode open-circuit voltage and an anode voltage in a state of charge based on the SOC-OCV correspondences of the anode and the normalized discharge curve of the anode;

(c1) calculating anodic polarization impedance in the state of charge based on the anode open-circuit voltage and the anode voltage, where the anodic polarization impedance is equal to a value obtained by subtracting the anode voltage from the anode open-circuit voltage and dividing a resulting difference by the preset current (that is, the second preset current); and (d1) changing the state of charge, and repeating step (a1) to step (d1) to obtain the anodic polarization impedance of the battery in the different states of charge, as shown in FIG. 5.

(2) Battery polarization impedance of the battery in the different states of charge in the $n^{th}$ charge and discharge cycle is obtained, where n is an integer greater than or equal to 0. When n is less than a specific quantity of times (for example, 10 times or 20 times), the battery may be considered as a fresh battery.

In this embodiment, the step of obtaining the battery polarization impedance of the battery in the different states of charge in the $n^{th}$ charge and discharge cycle includes the following steps.

(a2) State of charge (SOC)-open-circuit voltage (OCV) correspondences of the battery are obtained. It should be noted that when a battery system is determined, SOC-OCV correspondences of the battery are usually fixed. Even if the battery has experienced n charge and discharge cycles, the SOC-OCV correspondences of the battery do not change. The method for obtaining the state of charge (SOC)-open-circuit voltage (OCV) correspondences of the battery has been described above, and is not repeated herein.

(b2) The battery is discharged with the preset current to obtain a discharge curve of the battery in the $n^{th}$ charge and discharge cycle. It should be noted that the preset current is the foregoing second preset current.

(c2) The battery polarization impedance of the battery in the different states of charge in the $n^{th}$ charge and discharge cycle is obtained based on the SOC-OCV correspondences and the discharge curve of the battery.

Specifically, the battery polarization impedance of the battery in the different states of charge in the $n^{th}$ charge and discharge cycle is obtained by using the following method.

(a3) The discharge curve of the battery is normalized based on the SOC-OCV correspondences of the battery.

(b3) A battery open-circuit voltage and a battery voltage in a state of charge are obtained based on the SOC-OCV correspondences and the normalized discharge curve of the battery.

(c3) The battery polarization impedance is calculated based on the battery open-circuit voltage and the battery voltage, where the battery polarization impedance is equal to a value obtained by subtracting the battery voltage from the battery open-circuit voltage and dividing a resulting difference by the preset current (that is, the second preset current).

Figure 6:
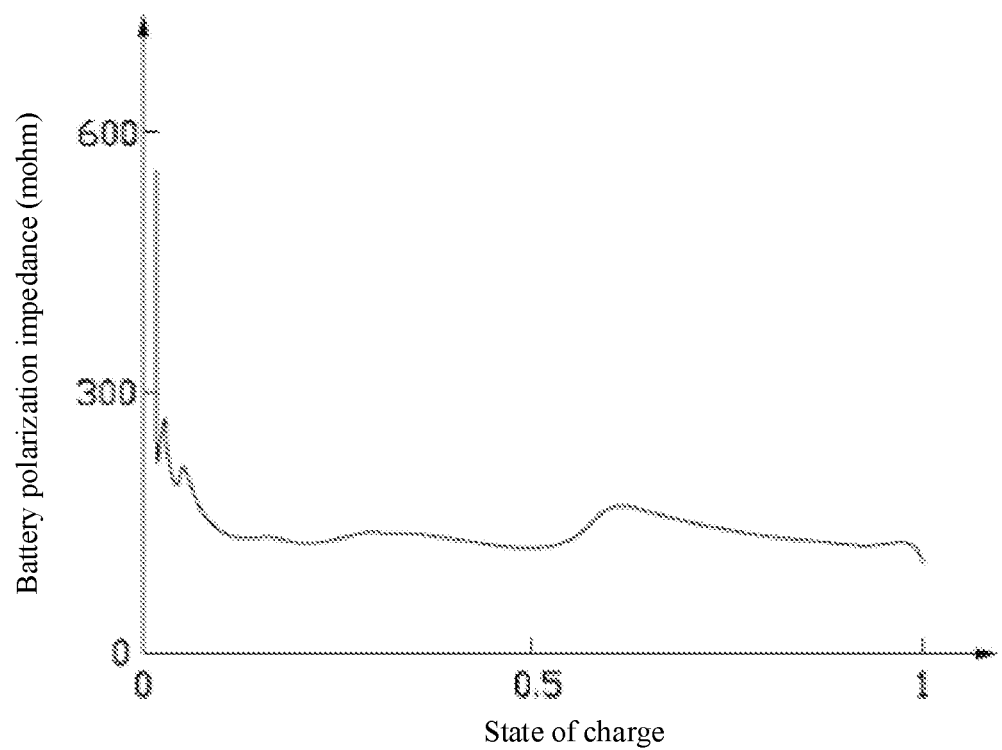
FIG. 6 is a graph of a state of charge-battery polarization impedance relationship curve of a battery according to this application.

(d3) The state of charge is changed, and step (a3) to step (d3) are repeated to obtain the battery polarization impedance of the battery in the different states of charge in the $n^{th}$ charge and discharge cycle, as shown in FIG. 6.

(3) Cathodic polarization impedance of the battery in the different states of charge in the $n^{th}$ charge and discharge cycle is calculated based on the battery polarization impedance and the anodic polarization impedance.

In this embodiment, the anodic polarization impedance is subtracted from the battery polarization impedance to obtain cathodic polarization impedance of the battery.

Specifically, the cathodic polarization impedance of the battery in the different states of charge in the $n^{th}$ charge and discharge cycle is obtained by using the following method:

(a4) obtaining an anodic polarization impedance of the battery in a state of charge;

(b4) obtaining battery polarization impedance of the battery in the state of charge in the $n^{th}$ charge and discharge cycle;

(c4) subtracting the anodic polarization impedance from the battery polarization impedance to obtain the cathodic polarization impedance; and (d4) changing the state of charge, and repeating step (a4) to step (d4) to obtain the cathodic polarization impedance of the battery in the different states of charge in the $n^{th}$ charge and discharge cycle.

(4) Cathode open-circuit voltages of the battery in the different states of charge and a cathodic limit potential of the battery are obtained.

In this embodiment, the cathode open-circuit voltages of the battery in the different states of charge may be obtained based on the SOC-OCV curve of the cathode of the battery obtained above.

In an embodiment, the cathodic limit potential of the battery is determined by characteristics of materials of the battery. It can be understood that the cathodic limit potential is related to characteristics of materials such as the cathode and the electrolyte solution of the battery. This can not only ensure stability of the cathode material, but also control a decomposed amount of the electrolyte solution, the side reactions of the cathode and the electrolyte solution, and the like. Specifically, CV scanning may be performed based on different materials (the cathode material, the electrolyte solution, and the like) to obtain a potential corresponding to oxidation reactions of the materials, and this potential may be used as the cathodic limit potential of the battery. Alternatively, different limit potentials are used to perform a cyclic charge and discharge test on the battery to ensure that capacity decay of the battery cell of the battery after cyclic charge and discharge is within an acceptable range (for example, at an ambient temperature of 45° C., capacity decay of the battery after 500 charge and discharge cycles of the battery is less than 20%), so as to determine a limit potential of the battery in a cyclic charging and discharging process.

(5) The second maximum charging current of the battery in the different states of charge in the $n^{th}$ charge and discharge cycle is calculated based on the cathode open-circuit voltages, the cathodic limit potential, and the cathodic polarization impedance.

In this embodiment, the second maximum charging current is equal to a value obtained by subtracting a cathode open-circuit voltage from the cathodic limit potential and dividing a resulting difference by cathodic polarization impedance.

Specifically, the step of calculating the second maximum charging current of the battery in the different states of charge in the $n^{th}$ charge and discharge cycle includes: obtaining cathodic polarization impedance $R_c$ of the battery in a state of charge in the $n^{th}$ charge and discharge cycle; obtaining a cathode open-circuit voltage $OCV_c$ of the battery in the state of charge; calculating a second maximum charging current $I_{max2}$ of the battery in the state of charge in the $n^{th}$ charge and discharge cycle of the battery; and changing the state of charge, and repeating the foregoing steps to obtain the second maximum charging current $I_{max2}$ of the battery in the different states of charge in the $n^{th}$ charge and discharge cycle of the battery. The second maximum charging current $I_{max2}$ of the battery in the state of charge in the $n^{th}$ charge and discharge cycle of the battery is equal to $(U_L-OCV_c)/R_c$, where $U_L$ is the cathodic limit potential.

In this embodiment, the battery is charged with the second charging current $I_b$ in the $(n+m)^{th}$ charge and discharge cycle, where m is the preset integer greater than or equal to 1, $I_b=k_1 \times I_c$, $0.5 \le k_1 \le 1$, and $I_c$ is the third charging current, where the third charging current $I_c$ is the smaller one of the first maximum charging current and the second maximum charging current in the same state of charge.

Figure 7:
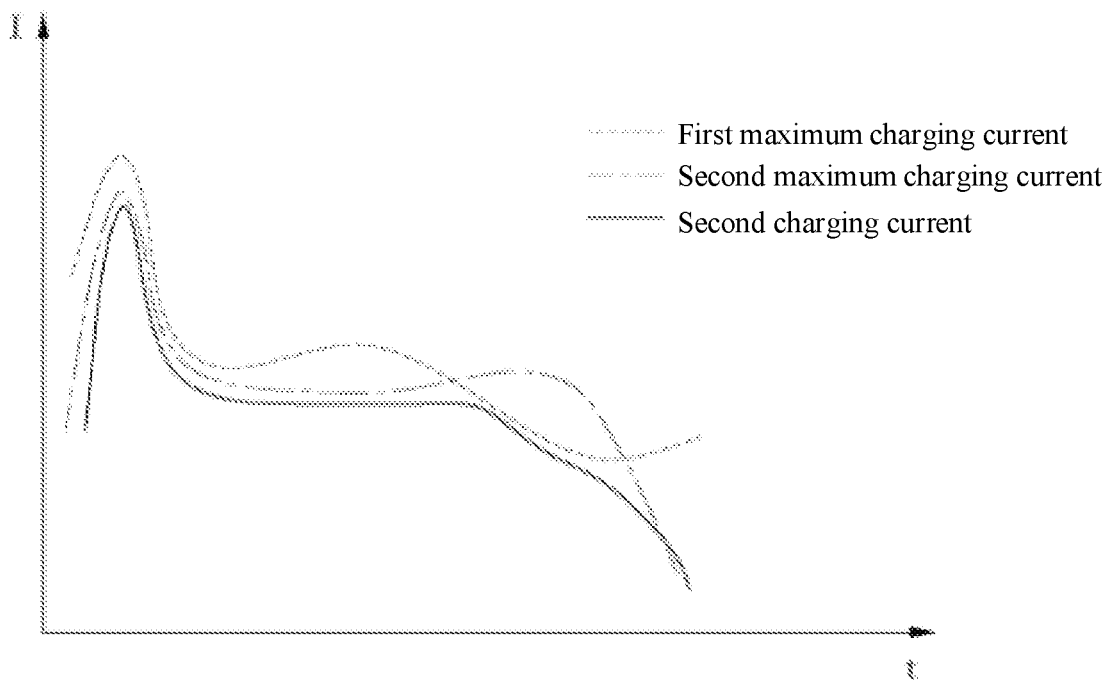
FIG. 7 is a graph of a determined charging current curve according to this application.

In this embodiment, the step of determining third charging currents in the different states of charge based on first maximum charging currents and second maximum charging currents includes: in a state of charge, comparing a first maximum charging current with a second maximum charging current; using a smaller one of the first maximum charging current and the second maximum charging current as a third charging current of the battery in the state of charge; changing the state of charge, and repeating the foregoing steps to determine the third charging currents of the battery in the different states of charge, as shown in FIG. 7; and establishing a relationship between the state of charge and the third charging current.

Then in the $(n+m)^{th}$ charge and discharge cycle, the battery is charged with the second charging current $I_b$.

In this embodiment, before the battery is charged with the second charging current $I_b$, a discharge capacity of the battery in the $n^{th}$ charge and discharge cycle is obtained, and the discharge capacity in the $n^{th}$ charge and discharge cycle is used as a charge cut-off capacity in the $(n+m)^{th}$ charge and discharge cycle. For example, a discharge capacity $Q_n$ of the battery in the $n^{th}$ charge and discharge cycle is obtained, and in the $(n+m)^{th}$ charge and discharge cycle of the battery, the battery is charged with the second charging current $I_b$ to the fully charged state. A charge cut-off capacity in the fully charged state is the discharge capacity Q of the battery in the $n^{th}$ charge and discharge cycle.

Specifically, the step of charging the battery with a second charging current $I_b$ in the $(n+m)^{th}$ charge and discharge cycle includes: in the $(n+m)^{th}$ charge and discharge cycle, dividing states of charge of the battery in a charging process into N intervals; obtaining, based on the correspondences, third charging currents corresponding to states of charge in each of the N intervals; obtaining a minimum value of the third charging currents corresponding to the states of charge in each interval, and using a product of the minimum value and $k_2$ as a corresponding second charging current of the interval, where $0.5 \le k_2 \le 1$; and in a charging process of the $(n+m)^{th}$ charge and discharge cycle, charging the battery to a fully charged state with the second charging current corresponding to the interval.

In other embodiments, $0.8 \le k_2 \le 1$, and a larger $k_2$ indicates shorter charge time required to charge the battery to a fully charged state. A charge capacity of each interval is equal to a product of an absolute value of a difference between states of charge corresponding to two end points of the corresponding interval and a discharge capacity $Q_n$ of the battery in the $n^{th}$ charge and discharge cycle, where a charge cut-off capacity when the battery is charged to the fully charged state is the discharge capacity $Q_n$. In this embodiment, in addition to a limit current of the cathode, a limit current of the anode needs to be considered for the current for charging the battery in the $(n+m)^{th}$ charge and discharge cycle. Therefore, in a charging process of the battery, the second charging current is used as a limit current for protecting the cathode and the anode of the battery, and the battery is charged with the second charging current, to protect the cathode and the anode of the battery and prolong cycle life of the battery. m may be less than or equal to 50, or may be another preset integer, depending on specific circumstances.

According to steps S1 and S2, the first maximum charging current may be calculated from the perspective of anode protection and the second maximum charging current may be calculated from the perspective of cathode protection, and then the second charging current for charging the battery is determined based on the first maximum charging current and the second maximum charging current. The technical solution of this application provides constraints for a limit charging current of the battery from perspectives of anode protection and cathode protection in a cyclic charging and discharging process, to ensure long cycle life of the battery while ensuring fast charging of the battery, thereby having great significance in long-term use of the battery.

To further describe the present invention, the method of charging a battery provided in this application is detailed below with reference to specific examples.

Comparative Example 1

The traditional method (for example, the constant current and constant voltage method described in Background) was used to charge the battery (a fresh battery that has experienced one charge and discharge cycle). In the charging process of the battery, an ambient temperature of 45° C. was used as an example.

1) The battery was charged with a constant charging current of 0.7 C to 4.45V.
2) The battery was charged with a constant charging voltage of 4.45V to a cut-off current of 0.05 C.
3) Rested for 5 min.

4) The battery was discharged with a constant discharging current of 0.5 C to a cut-off voltage (for example, 3.0V).

5) Rested for 5 min.

6) Step (1) to step (5) were repeated for 500 times, that is, the battery was cyclically charged and discharged for 500 times.

Example 1

The method of charging a battery provided in this application was used to charge the battery. It should be noted that in Example 1, the fresh battery (which has experienced one charge and discharge cycle) was used to obtain the third charging current, and the fresh battery was charged and discharged. In this process, the ambient temperature was the same as that in Comparative Example 1 and remained unchanged.

(1) State of Charge-Third Charging Current Correspondences were Established.

1) The anode potential of the fresh battery (with a battery capacity of 2000 mAh) was monitored all the time by using three electrodes and a potential monitor. The fresh battery might be prepared by using a cathode made of $LiCoO_2$, an anode made of graphite, a separator, an electrolyte solution, a packaging shell, and the like, or may be prepared by using a cathode and an anode made of other materials.

2) The lithium-precipitation anode potential of the fresh battery was determined.

3) In the charging process, the anode potential of the fresh battery was controlled to remain as the lithium-precipitation anode potential to obtain the first maximum charging current in different states of charge in the charging process.

4) In the charging process, the side reactions of the cathode material and the electrolyte solution of the battery were controlled to obtain the second maximum charging current in the different states of charge in the charging process.

5) The third charging current of the battery in the different states of charge was determined based on the first maximum charging current and the second maximum charging current, and the state of charge-third charging current correspondences were established.

(2) Charging Process

1) States of charge of the to-be-charged battery (namely, the battery) in the charging process were divided into 25 intervals. A minimum value of third charging currents corresponding to states of charge in each interval was obtained based on the foregoing correspondences. A product of the minimum value and $k_2$ was used as the second charging current of the interval. For example, when the state of charge interval was 40% to 45%, the obtained charging current was 1.5 A (0.75 C), and when the state of charge interval was 45% to 47%, the obtained charging current was 1.7 A (0.85 C).

2) The discharge capacity Q of the battery in the previous charge and discharge cycle was obtained.

3) The battery was charged with the constant second charging current corresponding to each state of charge interval in step 1), and the charge capacity was equal to the discharge capacity Q.

4) Rested for 5 min.

5) The battery was discharged with a constant discharging current of 0.5 C to a discharge cut-off voltage (for example, 3.0V), and the corresponding discharge capacity Q was obtained to serve as the charge capacity of the next charge and discharge cycle.

6) Rested for 5 min.

7) Step (3) to step (6) were repeated for 500 times, that is, the battery was cyclically charged and discharged for 500 times.

Example 2

It was the same as Example 1, except that $k_2=0.8$ was used in step 2) of the charging process in Example 2.

Example 3

It was the same as Example 1, except that $k_2=0.5$ was used in step 2) of the charging process in Example 2.

Comparative Example 2

It was the same as the Comparative Example 1, except that a battery that has experienced 200 charge and discharge cycles was used for charge and discharge.

Example 4

The method of charging a battery provided in this application was used to charge the battery. It should be noted that in Examples 4 and 5, the batteries that have been cyclically charged and discharged for 200 times were used to obtain the third charging current, and the batteries were charged and discharged. In this process, the ambient temperature was the same as that in Comparative Example 2 and remained unchanged.

(1) State of Charge-Third Charging Current Correspondences were Established.

Different from step (1) of Example 1, in this step, a battery that has been cyclically charged and discharged for 200 times was used to establish the state of charge-third charging current correspondences.

(2) Charging Process

The charging process was the same as that is Example 1, except that a battery that has been cyclically charged and discharged for 200 times was used for charge and discharge.

Example 5

It was the same as Example 4, except that $k_2=0.5$ was used in step 2) of the charging process in Example 5.

In the charging and discharging processes of Comparative Examples 1 and 2 and Examples 1 to 5, corresponding parameters (capacity retention rates and full charge time) were obtained, and the parameters were recorded in Table 1.

TABLE 1

Test results of comparative examples and examples

|  | Value of $k_2$ | Battery capacity retention rate after 500 charge and discharge cycles | Battery full charge time (min) required in the first charge and discharge cycle | Battery full charge time required (min) in the 500$^{th}$ charge and discharge cycle |
| --- | --- | --- | --- | --- |
| Comparative Example 1 | — | 88.1% | 78 | 90 |
| Example 1 | 1 | 89.8% | 45.8 | 43.5 |

TABLE 1-continued

Test results of comparative examples and examples

| | Value of $k_2$ | Battery capacity retention rate after 500 charge and discharge cycles | Battery full charge time (min) required in the first charge and discharge cycle | Battery full charge time required (min) in the $500^{th}$ charge and discharge cycle |
|---|---|---|---|---|
| Example 2 | 0.8 | 89.4% | 57 | 54 |
| Example 3 | 0.5 | 88.6% | 82 | 79 |
| Comparative Example 2 | — | 85.2% | 82 | 98 |
| Example 4 | 1 | 86.2% | 40 | 36 |
| Example 5 | 0.5 | 85.6% | 79 | 73 |

It can be learned from Table 1 that the battery charge time required by the method provided in the technical solution of this application was significantly shorter than the battery charge time required by the traditional method. For example, in Comparative Example 2 using the traditional method, the battery full charge time required in the first charge and discharge cycle was 82 minutes, while in Example 4 using the method provided in this application, the battery full charge time required in the first charge and discharge cycle was only 40 minutes. In addition, in Comparative Example 2 using the traditional method, the battery full charge time required in the $500^{th}$ charge and discharge cycle was 98 minutes, while in Example 4 using the method provided in this application, the battery full charge time required in the $500^{th}$ charge and discharge cycle was only 36 minutes. It can be learned that in the entire charge and discharge cycle, the time to charge the battery to the fully charged state required by the method provided in this application was significantly shorter than the time to charge the battery to the fully charged state required by the traditional method.

Figure 8:
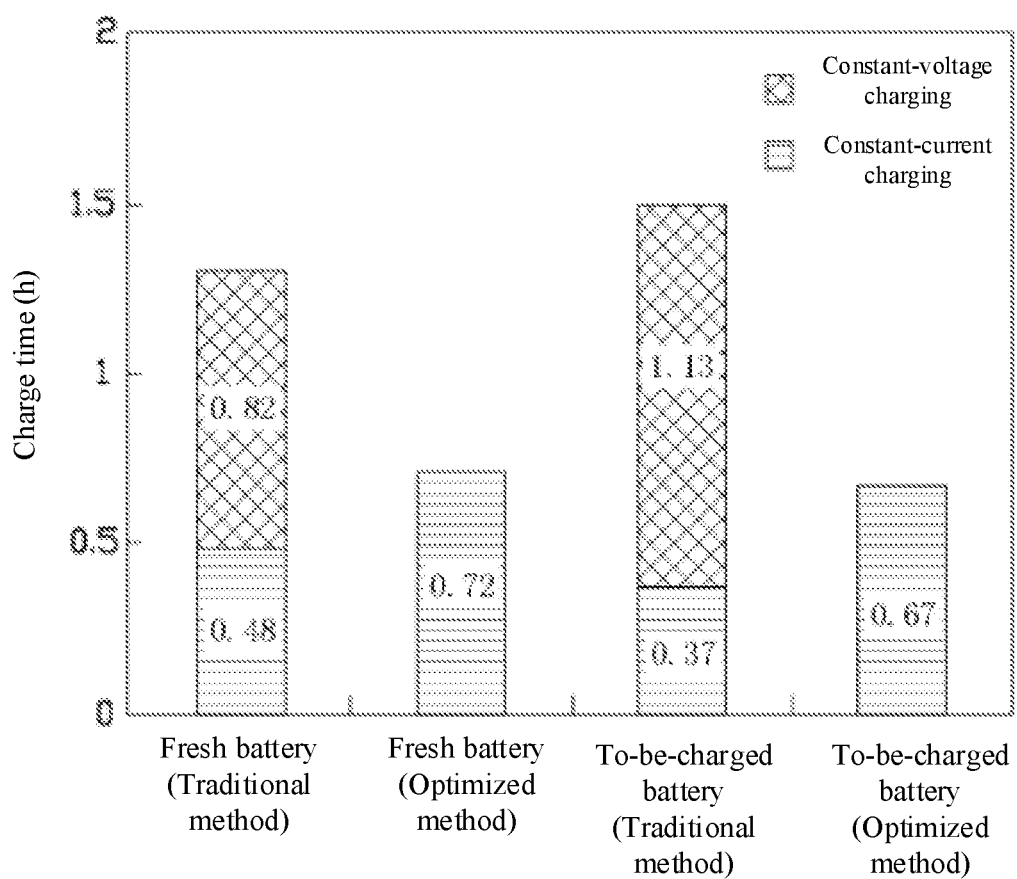
FIG. 8 is a comparison diagram of time required to charge a fresh battery and a to-be-charged battery by using a method in Example 1 of this application and a traditional method in Comparative Example 1.

Referring to FIG. 8, FIG. 8 is a comparison diagram of time required to charge a fresh battery and a to-be-charged battery (that is, the battery) by using a method (that is, the optimized method) in Example 1 and a traditional method in Comparative Example 1 (that is the constant current and voltage method in Background). The to-be-charged battery was a battery obtained after cyclically charging and discharging a fresh battery for 500 times. It can be learned from FIG. 8 that the first bar from left to right indicates that in the process of using the traditional method to charge the fresh battery, the time required for the constant current charging phase was 0.48 hours, the time required for the constant voltage charging phase was 0.82 hours, and 1.3 hours was needed in total to fully charge the fresh battery. The second bar from indicates that in the process of using the method provided in this application to charge the fresh battery, only 0.72 hours was needed to fully charge the fresh battery. This significantly shortened charge time. For the batteries that have been cyclically charged and discharged for 500 times, the third bar indicates that in the process of using the traditional method to charge the to-be-charged battery, the time required for the constant current charging phase was 0.37 hours, the time required for the constant voltage charging phase was 1.13 hours, and 1.5 hours was needed in total to fully charge the battery. The fourth bar indicates that in the process of using the method provided in this application to charge the to-be-charged battery, only 0.67 hours was needed to fully charge the to-be-charged battery. This also significantly shortened charge time. The charge time of the to-be-charged battery required by the method provided in the technical solution of this application was shorter than the charge time required by the fresh battery.

Figure 9:
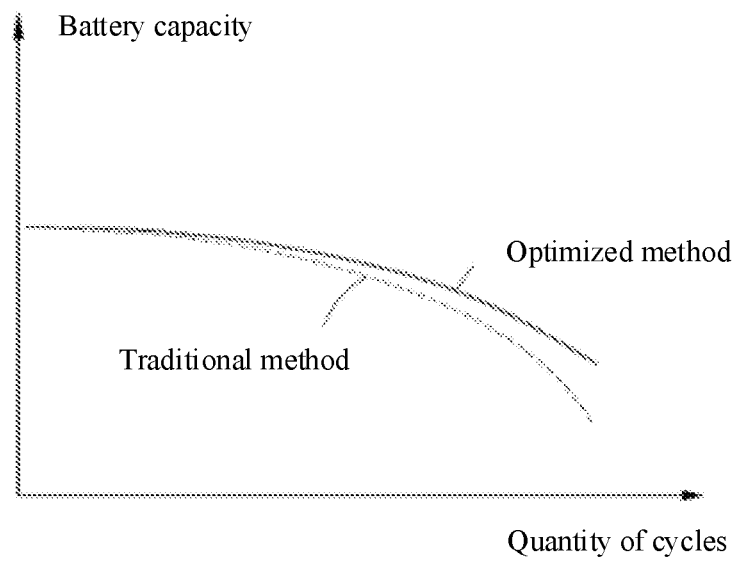
FIG. 9 is a comparative schematic diagram of battery capacity decay when a battery is charged and discharged using a traditional method in Comparative Example 1 and a method in Example 1 of this application.
Figure 10:
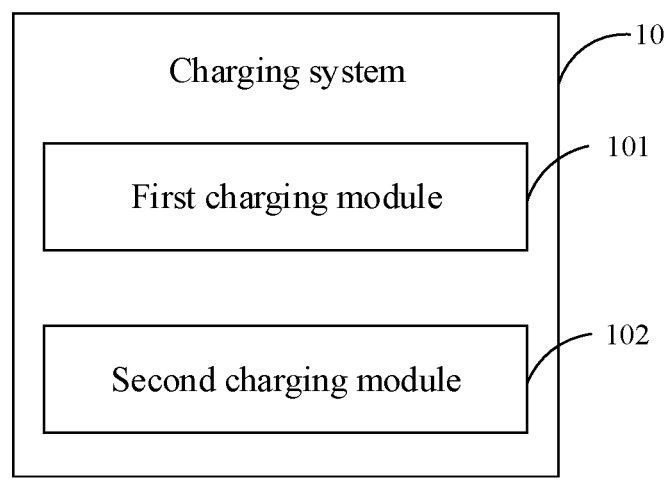
FIG. 10 is a modular diagram of a charging system according to an embodiment of this application.

In addition, the battery charge time required by the method provided in the technical solution of this application was significantly shorter than the battery charge time required by the traditional method. While avoiding lithium precipitation at the anode and suppressing the side reactions of the cathode material and the electrolyte solution, this can significantly shorten battery charge time to implement fast charging. In addition, the method in this application can also reduce battery capacity decay and improve cycle life of the battery, as shown in FIG. 9. When the battery was charged and discharged by using the traditional method, the capacity of the battery decayed more as the quantity of cycles increased, whereas when the battery was charged and discharged by using the optimized method provided in this application, the capacity of the battery decayed less as the quantity of cycles increased. Referring to FIG. 10, in an embodiment, the charging system 10 may be divided into one or more modules. The one or more modules are stored in the memory 11 and executed by at least one processor (by one processor 12 in this embodiment) to complete this application. The one or more modules may be a series of computer program instruction segments capable of completing specific functions, and the instruction segments are used to describe the execution process of the charging system 10 in the electronic apparatus 1. For example, the charging system 10 may be divided into a first charging module 101 and a second charging module 102 in FIG. 10.

In another embodiment, the charging system 10 may be divided into one or more modules. The one or more modules are stored in the processor 12 and executed by the processor 12 to complete this application.

Specifically, the first charging module 101 is configured to charge the battery with a first charging current in the $n^{th}$ charge and discharge cycle; and the second charging module 102 is configured to charge the battery with a second charging current in the $(n+m)^{th}$ charge and discharge cycle, where m is a preset integer greater than or equal to 1, $I_b = k_1 \times I_c$, $0.5 \leq k_1 \leq 1$, and $I_c$ is a third charging current.

The charging system 10 in this application determines the second charging current for charging the battery from the perspective of suppressing side reactions of a cathode and an electrolyte solution of the battery and avoiding lithium precipitation at an anode of the battery, and uses the second charging current to charge the battery, thereby not only ensuring fast charging of the battery, but also ensuring that the battery has long cycle life under fast charging. For specific content, referring to the embodiment of the foregoing method of charging a battery. Details are not described herein again.

In this embodiment, the memory 11 may be an internal memory of the electronic apparatus 1, that is, a memory built in the electronic apparatus 1. In other embodiments, the memory 11 may alternatively be an external memory of the electronic apparatus 1, that is, a memory externally connected to the electronic apparatus 1.

In some embodiments, the memory 11 is configured to store program code and various data, for example, program code of the charging system 10 installed on the electronic apparatus 1, and implement high-speed and automatic access of the program or data during operation of the electronic apparatus 1. For example, in this embodiment, the charging system 10 is configured to determine the second charging current of the battery in the $(n+m)^{th}$ charge and discharge cycle by using the foregoing method, and charge the battery with the second charging current.

In some embodiments, the memory 11 may include a random access memory, or may include a non-volatile memory, for example, a hard disk, a memory, a plug-in hard disk drive, a smart media card (SMC), and a secure digital (SD) card, a flash card (FC), at least one magnetic disk storage device, a flash memory device, or other volatile solid state storage devices.

In an embodiment, the processor 12 may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor 12 may alternatively be any conventional processor or the like.

When the modules of the charging system 10 are implemented in a form of a software functional unit and sold or used as an independent product, the integrated unit may be stored in a computer-readable storage medium. Based on such an understanding, all or some of the processes of the methods in the embodiments of this application may be implemented by a computer program instructing relevant hardware. The computer program may be stored in a non-volatile readable storage medium. When the computer program is executed by the processor, the steps of the methods in the embodiments can be performed. The computer program includes computer program code, and the computer program code may be in a source code form, an object code form, an executable file form or some intermediate forms, or the like. The non-volatile readable storage medium may include any entity or apparatus, recording medium, USB flash drive, removable hard disk, magnetic disk, optical disc, computer memory, read-only memory (ROM), and the like capable of carrying the computer-readable instruction code.

It can be understood the foregoing module division is merely logical function division, and may be other division during actual embodiment. In addition, functional modules in the embodiments of this application may be integrated into a same processing unit, or each of the modules may exist alone physically, or two or more modules are integrated into a same unit. The integrated module may be implemented in a form of hardware, or may be implemented in a form of hardware and a software functional module.

For those skilled in the art, it is obvious that this application is not limited to the details of the foregoing embodiments, and this application may be implemented in other specific forms without departing from the spirit or basic characteristics of this application. Therefore, either way, the foregoing embodiments of this application should be considered exemplary and non-restrictive. The scope of this application is defined by the appended claims rather than the foregoing descriptions, and therefore this application is intended to cover all changes falling within the meanings and scope of the equivalent of the claims.

What is claimed is:

1. A method of charging a battery, comprising steps of:
  charging the battery with a first charging current $I_a$ in an $n^{th}$ charge and discharge cycle, wherein n is an integer greater than or equal to 0; and
  charging the battery with a second charging current $I_b$ in an $(n+m)^{th}$ charge and discharge cycle, wherein m is a preset integer greater than or equal to 1, $I_b=k_1 \times I_c$, $0.5 \leq k_1 \leq 1$, and $I_c$ is a third charging current,
  wherein the third charging current $I_c$ is a smaller one of a first maximum charging current $I_{max1}$ and a second maximum charging current $I_{max2}$ in a same state of charge,
  the first maximum charging current $I_{max1}$ is a maximum current of an anode of the battery in different states of charge in the $n^{th}$ charge and discharge cycle without lithium precipitation, and
  the second maximum charging current $I_{max2}$ is a maximum current that controls side reactions of a cathode material and an electrolyte solution of the battery in the different states of charge in the $n^{th}$ charge and discharge cycle.

2. The method according to claim 1, wherein the maximum current of the anode of the battery in the different states of charge in the $n^{th}$ charge and discharge cycle without lithium precipitation is obtained by using the following steps:
  obtaining lithium precipitation charging rates of the battery at different temperatures;
  determining lithium precipitation anode potentials of the battery at the different temperatures based on the lithium precipitation charging rates; and
  obtaining the maximum current of the battery in the different states of charge in the $n^{th}$ charge and discharge cycle without the lithium precipitation based on the lithium precipitation anode potentials at the different temperatures.

3. The method according to claim 2, wherein the step of obtaining lithium precipitation charging rates of the battery at different temperatures comprises:
  a first charging step, after the battery is discharged to a fully discharged state, charging the battery with a first preset current to a fully charged state at a preset temperature;
  a first discharging step, discharging the battery with a second preset current to the fully discharged state;
  a cycling step, determining whether the lithium precipitation occurs on the battery after the first charging step and the first discharging step are cycled for a preset quantity of times;
  a first determining step, when the lithium precipitation occurs on the battery, determining a lithium precipitation charging rate of the battery at the preset temperature; and
  a first repeating step, changing the preset temperature, and repeating the first charging step to the first repeating step to obtain the lithium precipitation charging rates of the battery at the different temperatures.

4. The method according to claim 3, wherein the step of determining lithium precipitation anode potentials of the battery at the different temperatures based on the lithium precipitation charging rates comprises:

a second charging step, at the preset temperature, charging the battery at the lithium-precipitation charging rate corresponding to the preset temperature;

a monitoring step, monitoring an anode potential of the battery in a charging process;

a second determining step, determining a lithium precipitation anode potential of the battery at the preset temperature based on a change of the anode potential; and a second repeating step, changing the preset temperature, and repeating the second charging step to the second repeating step to obtain the lithium precipitation anode potentials of the battery at the different temperatures.

5. The method according to claim 2, wherein the step of obtaining the maximum current of the battery in different states of charge without lithium precipitation based on the lithium precipitation anode potentials at the different temperatures comprises obtaining the maximum current of the battery in the different states of charge without the lithium precipitation in the charging process at each of the different temperatures by following steps:

at a preset temperature corresponding to the each of the different temperatures, charging the battery with a preset initial charging current;

in a charging process of the $n^{th}$ charge and discharge cycle, controlling an anode potential of the battery to remain as a lithium precipitation anode potential corresponding to the preset temperature; and at the preset temperature, monitoring and obtaining the maximum current of the battery in the different states of charge without the lithium precipitation in the charging process.

6. The charging method according to claim 1, wherein the maximum current that controls the side reactions of the cathode material and the electrolyte solution of the battery in the different states of charge in the $n^{th}$ charge and discharge cycle is obtained by using the following steps:

obtaining an anodic polarization impedance of the battery in the different states of charge;

obtaining a battery polarization impedance of the battery in the different states of charge in the $n^{th}$ charge and discharge cycle, wherein n is an integer greater than or equal to 0;

calculating a cathodic polarization impedance of the battery in the different states of charge in the $n^{th}$ charge and discharge cycle based on the battery polarization impedance and the anodic polarization impedance;

obtaining cathode open-circuit voltages of the battery in the different states of charge and a cathodic limit potential of the battery; and calculating, based on the cathode open-circuit voltages, the cathodic limit potential, and the cathodic polarization impedance, the maximum current that controls the side reactions of the cathode material and the electrolyte solution of the battery in the different states of charge in the $n^{th}$ charge and discharge cycle of the battery.

7. The method according to claim 6, wherein the step of obtaining anodic polarization impedance of the battery in the different states of charge comprises:

obtaining state of charge (SOC)-open-circuit voltage (OCV) correspondences of the anode of the battery;

discharging the battery with a preset current to obtain a discharge curve of the anode of the battery; and obtaining the anodic polarization impedance based on the SOC-OCV correspondences of the anode and the discharge curve of the anode.

8. The charging method according to claim 7, wherein the step of obtaining the anodic polarization impedance based on the SOC-OCV correspondences of the anode and the discharge curve of the anode comprises:

a first processing step, normalizing the discharge curve of the anode based on the SOC-OCV correspondences of the anode;

a first obtaining step, obtaining an anode open-circuit voltage and an anode discharge potential in a state of charge based on the SOC-OCV correspondences of the anode and the normalized discharge curve of the anode;

a first calculation step, calculating the anodic polarization impedance in the state of charge based on the anode open-circuit voltage and the anode discharge potential, wherein the anodic polarization impedance is equal to a value obtained by subtracting the anode discharge potential from the anode open-circuit voltage and dividing a resulting difference by the preset current; and a first repeating step, changing the state of charge, and repeating the first obtaining step to the first repeating step to obtain the anodic polarization impedance of the battery in the different states of charge.

9. The charging method according to claim 6, wherein the step of obtaining the battery polarization impedance of the battery in the different states of charge in the $n^{th}$ charge and discharge cycle comprises:

obtaining state of charge (SOC)-open-circuit voltage (OCV) correspondences of the battery;

discharging the battery with a preset current to obtain a discharge curve of the battery in the $n^{th}$ charge and discharge cycle; and obtaining the battery polarization impedance of the battery in the different states of charge in the $n^{th}$ charge and discharge cycle based on the SOC-OCV correspondences and the discharge curve of the battery.

10. The charging method according to claim 9, wherein the step of obtaining the battery polarization impedance of the battery in the different states of charge in the $n^{th}$ charge and discharge cycle based on the SOC-OCV correspondences and the discharge curve of the battery comprises:

a second processing step, normalizing the discharge curve of the battery based on the SOC-OCV correspondences of the battery;

a second obtaining step, obtaining a battery open-circuit voltage and a battery voltage in a state of charge based on the SOC-OCV correspondences and the normalized discharge curve of the battery;

a second calculation step, calculating the battery polarization impedance in the state of charge based on the battery open-circuit voltage and the battery voltage, wherein the battery polarization impedance is equal to a value obtained by subtracting the battery voltage from the battery open-circuit voltage and dividing a resulting difference by the preset current; and a second repeating step, changing the state of charge, and repeating the second obtaining step to the second repeating step to obtain the battery polarization impedance of the battery in the different states of charge in the $n^{th}$ charge and discharge cycle.

11. The method according to claim 6, wherein the step of calculating the cathodic polarization impedance of the battery in the different states of charge in the $n^{th}$ charge and discharge cycle based on the battery polarization impedance and the anodic polarization impedance comprises:

a first obtaining step, obtaining an anodic polarization impedance of the battery in a state of charge;

a second obtaining step, obtaining battery polarization impedance of the battery in the state of charge in the $n^{th}$ charge and discharge cycle;

a third calculation step, subtracting the anodic polarization impedance from the battery polarization impedance to obtain the cathodic polarization impedance; and a third repeating step, changing the state of charge, and repeating the first obtaining step to the third repeating step to obtain the cathodic polarization impedance of the battery in the different states of charge in the $n^{th}$ charge and discharge cycle.

12. The method according to claim 6, wherein the step of calculating, based on the cathode open-circuit voltages, the cathodic limit potential, and the cathodic polarization impedance, the maximum current that controls the side reactions of the cathode material and the electrolyte solution of the battery in the different states of charge in the $n^{th}$ charge and discharge cycle of the battery comprises:

obtaining a cathodic polarization impedance $R_c$ of the battery in a state of charge in the $n^{th}$ charge and discharge cycle;

obtaining a cathode open-circuit voltage $OCV_c$ of the battery in the state of charge;

calculating a maximum current that controls the side reactions of the cathode material and the electrolyte solution of the battery in the state of charge in the $n^{th}$ charge and discharge cycle of the battery; and changing the state of charge, and repeating the foregoing steps to obtain the maximum current that controls the side reactions of the cathode material and electrolyte solution of the battery in the different states of charge in the $n^{th}$ charge and discharge cycle of the battery.

13. The method according to claim 12, wherein the second maximum charging current $I_{max2}$ that controls the side reactions of the cathode material and the electrolyte solution of the battery in the state of charge in the $n^{th}$ charge and discharge cycle of the battery is calculated by using the following formula: second maximum charging current $I_{max2}=(U_L-OCV_c)/R_c$, wherein UL is the cathodic limit potential.

14. The method according to claim 1, wherein the third charging current $I_c$ is obtained by using the following steps:

in a state of charge, comparing a first maximum charging current $I_{max1}$ with a second maximum charging current $I_{max2}$;

using a smaller one of the first maximum charging current $I_{max1}$ and the second maximum charging current $I_{max2}$ as a third charging current $I_c$ of the battery in the state of charge;

changing the state of charge, and repeating the foregoing steps to determine third charging currents $I_c$ of the battery in the different states of charge; and establishing a relationship between the state of charge— and the third charging current $I_c$.

15. The method according to claim 14, wherein the step of charging the battery with a second charging current in the $(n+m)^{th}$ charge and discharge cycle comprises:

in the $(n+m)^{th}$ charge and discharge cycle, dividing states of charge of the battery in a charging process into N intervals;

obtaining, based on the correspondences, third charging currents $I_c$ corresponding to states of charge in each of the N intervals;

obtaining a minimum value of the third charging currents $I_c$ corresponding to the states of charge in each interval, and using a product of the minimum value and $k_2$ as a corresponding second charging current $I_b$ of the interval, wherein $0.5 \leq k_2 \leq 1$; and in the $(n+m)$th charge and discharge cycle, charging the battery to a fully charged state with the second charging current $I_b$ corresponding to the interval.

16. The method according to claim 15, wherein a charge capacity of each interval is equal to a product of an absolute value of a difference between states of charge corresponding to two end points of the corresponding interval and a discharge capacity $Q_n$ of the battery in the $n^{th}$ charge and discharge cycle, wherein a charge cut-off capacity when the battery is charged to the fully charged state is the discharge capacity $Q_n$.

17. An electronic apparatus, wherein the electronic apparatus comprises:

a battery; and a processor, configured to perform a method to charge the battery, the method comprising:

charging the battery with a first charging current $I_a$ in an $n^{th}$ charge and discharge cycle, wherein n is an integer greater than or equal to 0; and charging the battery with a second charging current $I_b$ in an $(n+m)^{th}$ charge and discharge cycle, wherein m is a preset integer greater than or equal to 1, $I_b=k_1 \times I_c$, $0.5 \leq k_1 \leq 1$, and $I_c$ is a third charging current, wherein the third charging current $I_c$ is a smaller one of a first maximum charging current $I_{max1}$ and a second maximum charging current $I_{max2}$ in a same state of charge, the first maximum charging current $I_{max1}$ is a maximum current of an anode of the battery in different states of charge in the $n^{th}$ charge and discharge cycle without lithium precipitation, and the second maximum charging current $I_{max2}$ is a maximum current that controls side reactions of a cathode material and an electrolyte solution of the battery in the different states of charge in the $n^{th}$ charge and discharge cycle.

18. A non-transitory storage medium storing at least one computer instruction, wherein the instruction is loaded by a processor and used to perform a method, the method comprising:

charging the battery with a first charging current $I_a$ in an $n^{th}$ charge and discharge cycle, wherein n is an integer greater than or equal to 0; and charging the battery with a second charging current $I_b$ in an $(n+m)^{th}$ charge and discharge cycle, wherein m is a preset integer greater than or equal to 1, $I_b=k_1 \times I_c$, $0.5 \leq k_1 \leq 1$, and $I_c$ is a third charging current, wherein the third charging current $I_c$ is a smaller one of a first maximum charging current $I_{max1}$ and a second maximum charging current $I_{max2}$ in a same state of charge, the first maximum charging current $I_{max1}$ is a maximum current of an anode of the battery in different states of charge in the $n^{th}$ charge and discharge cycle without lithium precipitation, and the second maximum charging current $I_{max2}$ is a maximum current that controls side reactions of a cathode material and an electrolyte solution of the battery in the different states of charge in the $n^{th}$ charge and discharge cycle.

* * * * *